Patented Nov. 27, 1928.

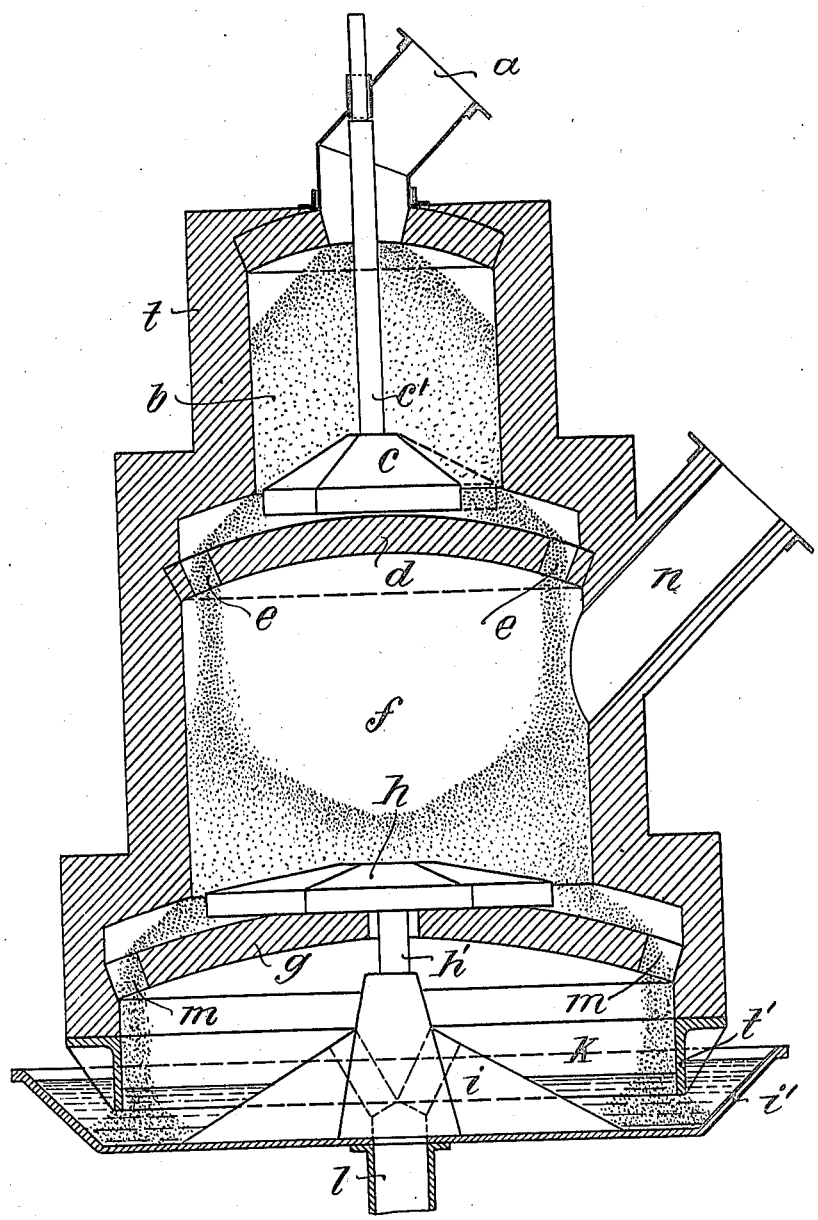

1,693,483

UNITED STATES PATENT OFFICE.

PAUL JAWORSKI, OF WIELKIE-HAJDUKI, POLAND, ASSIGNOR TO THE FIRM BISMARCKHÜTTE, OF BISMARCKHÜTTE/POLNISCH OBER-SCHLESIEN.

GAS PRODUCER.

Application filed May 11, 1925, Serial No. 29,605, and in Germany May 13, 1924.

This invention relates to a device for generating gas from coal dust or a similar fuel in a finely divided state, and the object is to provide a simple and effective gas producer in a compact form.

According to this invention, the gas producer comprises superposed chambers which are interconnected, and act as a fuel preheating chamber, a gas generating chamber, and an ash removing or ash containing chamber, the fuel preheating and gas generating chambers having rotatable grates therein, whilst a rotatable ash pan and seal are provided at the bottom of the ash chamber.

The fuel is fed to the upper end of the fuel preheating chamber, and sinks on to a conical grate, preferably in the form of a pyramid, which rotates within the preferably cylindrical preheating chamber, and distributes the preheated and sintered fuel through ports at the lower periphery of this chamber. The fuel preheating chamber is superposed on and separated from the gas generating chamber by an arched division, which is provided with ports which extend from the upper periphery of the preheating chamber, through which ports the preheated fuel passes, as described above. In the same way the gas generating chamber is preferably cylindrical, and is superposed on the ash chamber, which is of larger diameter and is separated from the gas generating chamber by a ported and arched division wall, the ports being similarly arranged to those which establish communication between the fuel preheating and gas generating chambers, that is to say, the ports extend from the upper periphery of the ash chamber to the lower periphery of the gas generating chamber. A conical or pyramidal grate is adapted to rotate directly over the arch within the gas generating chamber, being driven by a shaft extending downwardly through the ash chamber, and connected to an ash pan, which also acts as a water seal.

The invention is illustrated in the accompanying drawing, which is a longitudinal section through one form of a gas producer, constructed in accordance with this invention, and having three superposed chambers.

The outer wall $t$ of the gas producer is substantially cylindrical, and is of three diameters. At the top end a supply hopper $a$ conducts the fuel to the preheating and sintering chamber $b$, in which a rotatable fuel charger $c$, driven by a shaft $c^1$ is provided. The fuel charger $c$ rotates over an arched division $d$ between the upper fuel preheating chamber $b$ and the gas generating chamber immediately below it. In the form shown, the chamber $f$ below the preheating chamber $b$ acts as a gas generating chamber, and is connected to the chamber $b$ by the ports $e$ on its upper periphery, which penetrate the division wall $d$, and then extend substantially radially to the lower periphery of the preheating chamber $b$. These ports open into the chamber $b$ just below the bottom or base of the pyramidal rotatable fuel charger $c$. The fuel in the chamber $b$ is heated by radiation from the upper portion of the walls $t$ and the arched division wall $d$. By the rotation of the pyramidal fuel charger $c$ this preheated fuel is constantly fed in suitable quantities through the ports $e$ to the upper periphery of the chamber $f$, so that the fuel in the chamber $f$ becomes heaped up at the sides and depressed at the centre, as indicated in the drawing. A producer gas off-take $n$ leads from the side of the gas generating chamber.

A pyramidal rotatable grate $h$ is also provided in the gas generating chamber $f$, and is located in the base thereof directly over an arched division $g$, which separates the gas generating chamber $f$ from the ash chamber $k$. Ports $m$ leading from the upper periphery of the ash chamber to the lower periphery of the gas generating chamber establish communication between these two chambers, and thereby enable the air blast to pass upwards through the ports $m$ into the gas generating chamber, and the ash and waste fuel to pass downwards into the ash chamber. The bottom of the ash chamber is formed, in the modification illustrated, of a rotatable pan $i$, which also is arranged to act as a water seal. For this purpose, a cast iron extension $t'$, on which the producer structure is arranged, depends downwards into the trough $i$, which is provided with outwardly extending inclined sides $i'$ to enable the ash to be readily removed by means of a scoop, dipping into the pan. The ash pan $i$ is fixed to rotate with a shaft $h^1$ which drives the pyramidal grate $h$. Air, conveniently under pressure, is blown through the central pipe $l$, which has branches leading through the ash pan into the ash chamber.

It will be seen that the air, entering at $l$, passes by the ports $m$ to the bottom periphery of the gas generating chamber. This air naturally spreads out in substantially conical form, which is also, as can be seen in the figure, the shape of the section of the fuel bed. In this way the air is caused to penetrate thoroughly and effectively every part of the fuel bed, whereby rapid and effective generation takes place without danger of clinkering.

The ashes fall in a dry state on to the water in the water seal, so that the ash comes into contact with the water at a point well below the openings of the ports $m$, so that the saturation of the ashes with water in these ports or at any point where they are likely to cause obstruction to the air draft is rendered impossible.

I claim:

1. In a gas producer for finely divided fuels, in combination, a common wall enclosing three substantially cylindrical superposed chambers of decreasing diameter, and constituting from bottom to top an ash chamber, a gas generating chamber and a fuel preheating chamber, a first transverse fuel supporting division wall spaced below the off-set between said ash pit and said gas generating chamber, a second transverse fuel supporting division wall spaced below the off-set between said gas generating chamber and said fuel preheating chamber, said division walls having fuel ports adjacent their peripheral edges but being imperforate to the passage of fuel at other portions, and mechanical means above each of said division walls for moving material supported therealong and formed between the division walls and the off-sets above them toward said ports, the ports in said first division wall also serving as inlets for air entering said gas generating chamber.

2. In a gas producer for finely divided fuels, in combination, a common wall enclosing three substantially cylindrical superposed chambers constituting from bottom to top an ash chamber, a gas generating chamber, and a fuel preheating chamber, a first arched division wall between said ash chamber and said gas generating chamber, a second arched division wall between said gas generating chamber and said fuel preheating chamber, said division walls having fuel ports adjacent their peripheral edges but being imperforate to the passage of fuel at other portions, a substantially pyramidal rotary fuel charger having its base peripheral edges disposed adjacent the ports in said second division wall, and a driving shaft for said fuel charger extending upwardly to the outside of said fuel preheating chamber.

3. In a gas producer for finely divided fuels, in combination, a common wall enclosing three substantially cylindrical superposed chambers constituting from bottom to top an ash chamber, a gas generating chamber, and a fuel preheating chamber, a first arched division wall between said ash chamber and said gas generating chamber, a second arched division wall between said gas generating chamber and said fuel preheating chamber, said division walls having fuel ports adjacent their peripheral edges but being imperforate to the passage of fuel at other portions, a substantially pyramidal rotary fuel charger having its base peripheral edges disposed adjacent the ports in said second division wall, a driving shaft for said fuel charger extending upwardly to the outside of said preheating chamber, a substantially pyramidal rotary grate having its base peripheral edges disposed adjacent the ports in said first division wall, and a driving shaft for said grate extending downwardly through said first division wall into the ash chamber.

4. In a gas producer for finely divided fuels, in combination, a common wall enclosing three substantially cylindrical superposed chambers of decreasing diameter and constituting from bottom to top an ash chamber, a gas generating chamber, and a fuel preheating chamber, a first arched division wall spaced below the off-set between said ash chamber and said gas generating chamber, a second arched division wall spaced below the off-set between said gas generating chamber and said fuel preheating chamber, said division walls having fuel ports adjacent their peripheral edges beneath the annular passages formed between the division walls and the off-sets above them but being imperforate for the passage of fuel at other portions, a substantially pyramidal rotary fuel charger having its base peripheral edges disposed adjacent the ports in said second division wall, and a driving shaft for said fuel charger extending upwardly to the outside of the fuel preheating chamber.

5. In a gas producer for finely divided fuels, in combination, a common wall enclosing three substantially cylindrical superposed chambers of decreasing diameter and constituting from bottom to top an ash chamber, a gas generating chamber, and a fuel preheating chamber, a first arched division wall spaced below the off-set between said ash chamber and said gas generating chamber, a second arched division wall spaced below the off-set between said gas generating chamber and said fuel preheating chamber, said division walls having fuel ports adjacent their peripheral edges beneath the annular passages formed between the division walls and the off-sets above them but being imperforate for the passage of fuel at other portions, a substantially pyramidal rotary fuel charger having its base peripheral edges disposed adjacent the ports in said second division wall, a driving shaft for said fuel charger extending upwardly to the outside of the fuel preheating chamber, a substantially pyramidal rotary grate having its base peripheral edges disposed adjacent the ports in said first division wall, and a driving shaft for said grate extending downwardly through said first division wall into the ash chamber.

In testimony whereof I affix my signature.

PAUL JAWORSKI.